Oct. 18, 1966 A. PREKERIS ETAL 3,280,248

TELEGRAPH SYSTEM

Filed April 1, 1963 2 Sheets-Sheet 1

INVENTORS.
ALGIMANTAS PREKERIS
BY JOEL M. BARNETT

ATTORNEY

INVENTORS.
ALGIMANTAS PREKERIS
JOEL M. BARNETT
BY
ATTORNEY

United States Patent Office 3,280,248
Patented Oct. 18, 1966

3,280,248
TELEGRAPH SYSTEM

Algimantas Prekeris, Jamaica, and Joel M. Barnett, Brooklyn, N.Y., assignors to International Telephone and Telegraph Corporation, Nutley, N.J., a corporation of Maryland Filed Apr. 1, 1963, Ser. No. 269,417
11 Claims. (Cl. 178—4)

This invention relates to telegraph systems and particularly to teletype systems in which substations may transmit signals via a main exchange to a distant exchange and are provided with automatic repetition service.

In such a system it is desirable to stop the operation of the transmitter distributor at the substation during the time the automatic repetition service is in operation in order to prevent large quantities of tape from piling up at the transmitter. Heretofore, this has been accomplished by means of a separate control loop between the substation and the main exchange.

It is one of the objects of this invention to provide a simple and inexpensive arrangement for stopping the operation of the transmitter distributor at the substation without the necessity of a separate control loop between the substation and the main exchange.

Another object of the invention is to provide an arrangement for stopping the operation of the transmitter distributor during the operation of the automatic repetition service using the receiver loop between the substation and the main exchange and the printer at the substation, and requiring only a minor adjustment of the printer.

Still another object of the invention is to provide a control signal generator at the main exchange which may be inserted as a link between the line to the distant exchange and the receiver loop to the substation and which will produce predetermined control signals during the operation of the automatic repetition service.

Other objects and objects relating to the different circuits and the manner of connecting them will be apparent as the description proceeds.

Briefly the invention comprises a signal generator at the main exchange for sending a signal representing a predetermined character over the receiver loop to the printer at the substation whenever the automatic repetition service is in operation. The printer at the substation is adjusted to respond to that particular signal and to operate a timing switch to stop the transmitter distributor for a time sufficient for the repetition service to complete one cycle.

One embodiment of the invention is illustrated in the accompanying drawings, in which.

Figure 1:
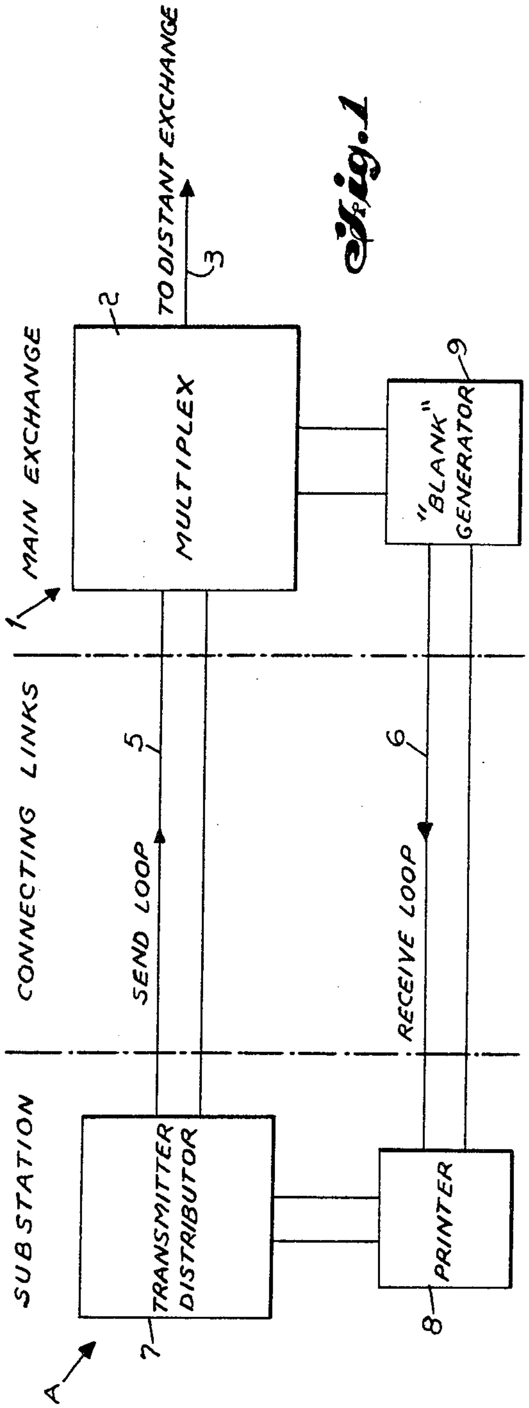
FIGURE 1 is a block diagram of a teletype system incorporating the invention.
Figure 2:
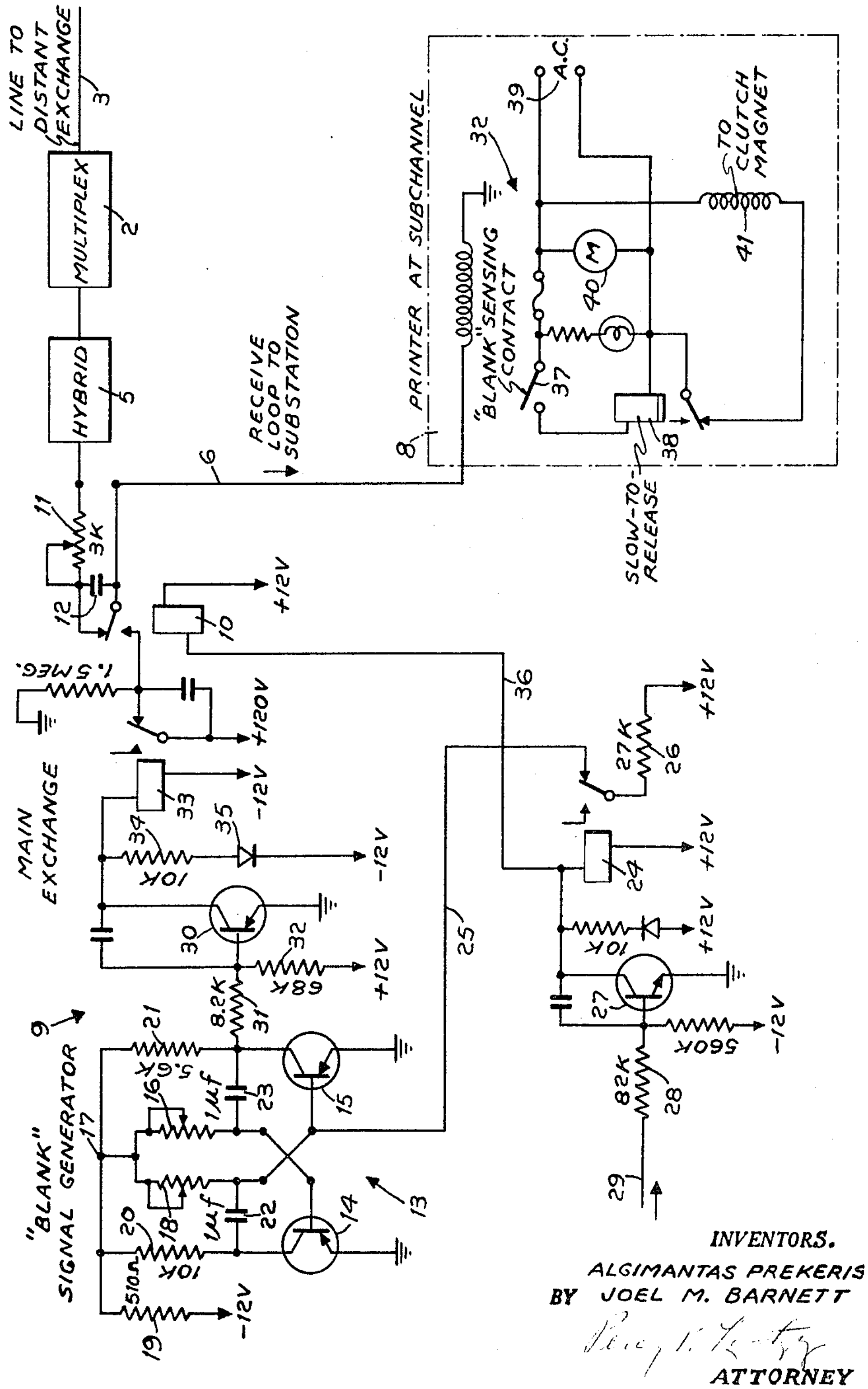
FIGURE 2 is a circuit diagram of those portions of the system which illustrate the invention.

Referring now to FIGURES 1 and 2 of the drawings, the invention is shown in connection with a main exchange 1 having a multiplex circuit 2 connected to a distant exchange (not shown) by means of a wire or radio channel 3. A substation A is linked to the main exchange 1 by the usual send loop 5 and receive loop 6. The substation comprises a transmitter distributor 7, from which signals are transmitted to the main exchange over the send loop 5, and a printer 8 which receives signals over the receive loop 6.

In accordance with the invention, use is made of the receive loop 6 to inform the substation that the automatic repetition service is in operation, so that the transmitter distributor 7 at the substation can be stopped during the repeating operation. The printer at the substation, by a very minor and well known adjustment, may be made to sense the receipt of signals representing any particular character. A character used for this purpose should be one that does not interfere with the normal operation of the printer in receiving a message. A "blank" is satisfactory for this purpose, although any other character may be used if desired. Hence, while the repetition service is in operation, a "blank" signal is sent over the receive loop 6 and is sensed by the printer to close a circuit which causes the transmitter distributor to stop in a manner to be described later.

In order to provide the "blank" signals, switch means is provided for disconnecting the multiplex circuit from the receive loop when the automatic repetition circuit is in operation and in its place connecting a "blank" signal generator 9. This is accomplished by inserting the armature and break contact of a relay 10 in the circuit of the receive loop 6. A potentiometer 11 is also connected in this circuit to adjust the voltage, and the break contact is bridged by a capacitor 12.

The heart of the "blank" signal generator is an astable multivibrator 13 comprising a pair of PNP transistors 14 and 15 coupled in a multivibrator circuit. The base of the transistor 14 is connected over an adjustable resistor 16 to a common point 17, and the base of the transistor 15 is connected over an adjustable resistor 18 to the common point 17, and this point is connected over a resistor 19 to a source of 12 volts negative.

With this arrangement, the resistor 18 will determine the length of the "space" pulse which is produced when the transistor 15 is conducting, and the resistor 16 will determine the length of the "mark" pulse when the transistor 14 is conducting.

The emitters of the two transistors 14 and 15 are connected to ground and the collector circuits are provided with resistors 20 and 21, respectively, which are connected to the point 17. A capacitor 22 is connected between the collector of the transistor 14 and the base of the transistor 15, and a capacitor 23 is connected between the collector of the transistor 15 and the base of the transistor 14. The adjustment of the resistors 16 and 18 and the values of the capacitors 22 and 23 are such that the transistor 15 conducts, producing a "space" condition, for a period of time equal to that occupied by the "start" unit and all the intelligence units of a character. Then the circuit will shift to cause the transistor 14 to conduct for the time of the "stop" unit.

Normally when the power is turned on, the multivibrator proceeds on its cycle, producing the long "space" pulse followed by the short "mark" pulse. However, it is desired to have the multivibrator start each time on the "space" pulse, and therefore a positive bias is provided on the base of the transistor 15 to maintain this transistor in the non-conducting or "off" condition when the multivibrator is not in use. This bias is removed when the multivibrator is to be turned on. This is accomplished by means of a relay 24 which has a break contact connected by a lead 25 to the base of the transistor 15, while the armature of the relay is connected over a resistor 26 to a source of 12 volts positive. When the relay is unoperated, the multivibrator is quiescent because of the bias, but when the relay is operated, the bias is removed and the multivibrator starts to oscillate.

The coil of the relay 24 is connected in the collector-emitter circuit of an NPN transistor 27, the collector of the transistor being connected to the relay coil, while the emitter is connected to ground. The other end of the relay coil is connected to 12 volts positive. The base of the transistor 27 is connected over a resistor 28 to a lead 29 to which is applied a positive voltage of 18 volts whenever the automatic repetition services is in operation. The manner of producing this voltage is not shown, but it will be understood that it appears when the signal is being repeated.

When the positive voltage appears on the lead 29, the transistor 27 will conduct, since it is an NPN transistor, and the relay 24 will operate, thus removing the bias from the base of the transistor 15 and causing the multivibrator to start oscillating commencing with a "space" pulse.

It is desired to produce a positive pulse on the receive lead 6 for each "space" condition of the multivibrator, and this is accomplished in the following manner:

The collector of the transistor 15 is connected to the base of an amplifying PNP transistor 30 through a resistor 31. The base of this transistor is also connected to 12 volts positive through a resistor 32. When the transistor 15 is off, the base of the transistor 30 is maintained sufficiently negative because of the current flow through resistors 32, 31, 21, and 19, to maintain the transistor 30 in the operating condition. When the transistor 15 comes on for a "space" signal, the base of the transistor 30 becomes more positive and the transistor ceases to conduct.

A relay 33 has one end of its energizing coil connected to 12 volts negative and the other end connected to the collector of the transistor 30. The emitter of that transistor is connected to ground. When the transistor comes on, the circuit through the energizing coil of the relay 33 will be complete and the relay will operate. A resistor 34 in series with a diode 35 is connected in parallel with the coil of the relay 33 to control the amount of current through the relay.

The armature of the relay 33 is connected to 120 volts positive, and the break contact thereof is connected to the make contact of the relay 10. When the relay 10 is operated and the relay 33 is pulsing, each time the transistor 15 is on to register a "space" condition, the relay 33 will be deenergized and 120 volts positive will be delivered over its break contact to the receive signal loop 6, and each time the transistor 11 is off for the "mark" condition, the relay 33 is energized and no voltage is applied to the receive signal loop because of the open break contact.

The energizing coil of the relay 10 is connected in parallel with that of the relay 24 over a lead 36 and operates simultaneously with the relay 24 when the positive potential appears on the lead 29 denoting the operation of the automatic repetition service.

When the automatic repetition starts, therefore, both relays 10 and 24 operate, the multivibrator 14–15 starts, and the "blank" signals are delivered to the substation over the receive lead 6, and continue to be so delivered until the automatic repetition service ends.

It will be understood that the printer 8 at the substation will be in the "on" condition in order to receive the "blank" signals over the receive loop 6 which feeds the signals into the printer.

By means of a special switch and the proper setting of a function bar in the printer, in a well-known manner, "blank" signals and only "blank" signals may be sensed. Accordingly a "blank" sensing contact 37 is provided which is arranged to be closed briefly when a "blank" signal has been received. This contact 37 is connected in series with the energizing winding of a slow-to-release relay 38 across the source 39 of alternating current which also drives the motor 40 for the transmitter distributor 7. The clutch magnet 41 for the transmitter distributor is connected across the source 39 in series with a break contact of the relay 38. When the relay operates, the clutch is deenergized and the transmitter distributor stops operating.

The slow-to-release relay 38, when operated by the brief closing of the "blank" sensing contact 37, is arranged to remain operated for a period of time sufficient for the automatic repetition service to complete its cycle of operation. If, during this time, a second "blank" signal is received, the contact 37 will be closed again momentarily and the relay 38 will receive another energizing pulse which will reset the timing of its release so that it will remain in its energized condition until after the last "blank" signal has been received, when it will release and restore the circuit through the clutch magnet to start the transmitter distributor again so that it will proceed to transmit in the normal manner.

Figure 3:
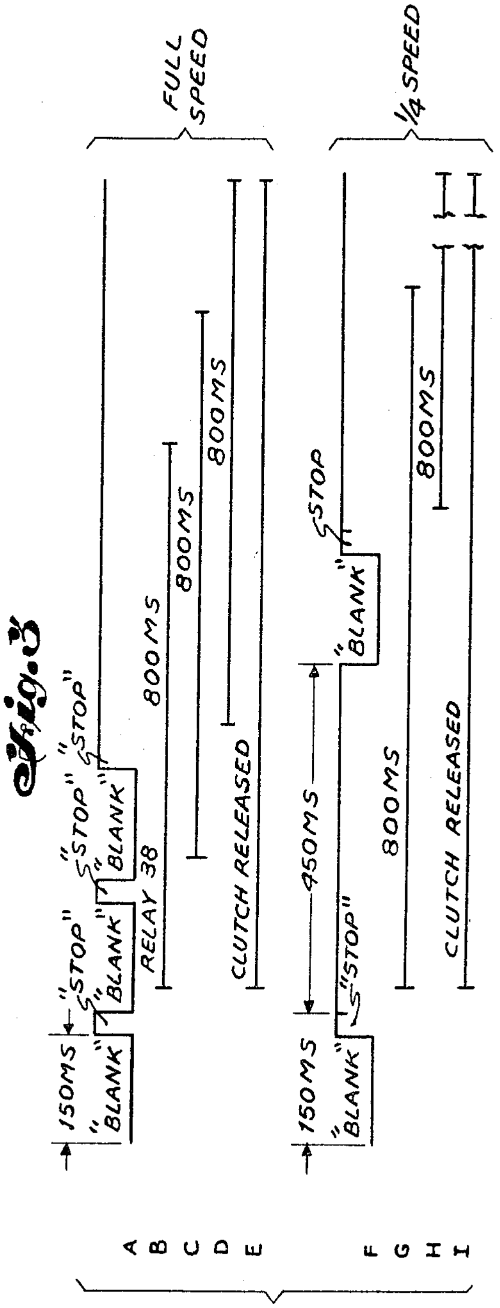
FIGURE 3 is a timing diagram showing the relation between the control signals and the clutch release.

FIGURE 3 shows the relation between the "blank" signals and the release of the transmitter distributor clutch. Lines A to E of that figure relate to full speed, while lines F to I relate to one quarter speed. The "blank" signals at full speed are shown on line A where three such signals occur in succession. The relay 38, in the particular arrangement shown, is designed to remain in the operated condition, when once operated, for a period of 800 milliseconds. Its operation is indicated on line B. It is energized first by the closing of the contact 37 which necessarily occurs after the "blank" signal has been received by the printer. After the next "blank" signal, it receives another energizing pulse, as indicated on line C. This reinstates the beginning of the delay period. The period is again reinstated after the next "blank" signal, as indicated on line D. Since there are no more "blank" signals, the relay will release at the end of the third 800 millisecond period. The clutch is released when the relay 38 pulls up and engages again when the relay releases, as is indicated on line E. At this time the transmitter distributor will start operating in the normal manner.

On line F the timing of the "blank" signals at one quarter speed is shown. Lines G and H show the operating time of the slow-to-release relay, and line I indicates the time during which the clutch is disengaged.

Other delay circuits may of course be used in place of the slow-to-release relay 38.

From the above it will be seen that I have provided a simple and inexpensive arrangement for shutting down the transmitter at the substation during the time of operation of the automatic repetition service at the main exchange. The astable multivibrator 14–15 may be adjusted as desired to produce signals representing other characters by adjusting the resistors 16 and 18 and also for any speed of operation. For example, the capacitors 18 and 19 have been given the value of 1 microfarad for full speed operation; for one quarter speed operation, the values of the capacitors would be 5 microfarads.

Many modifications may be made in the circuits, as shown, especially to adapt them to various types of equipment, and we do not therefore wish to limit the invention to what has been shown and described, except by the limitations contained in the appended claims.

We claim:

1. In a telegraph system having a substation equipped with a transmitter distributor and a printer and adapted to communicate with a distant exchange via a main exchange to which said substation is connected over a send loop and a receive loop, said main exchange being equipped with automatic repetition service, the combination comprising:

(a) a control signal generator at said main exchange;

(b) means at said main exchange responsive to the commencement of an automatic repetition operation for initiating the operation of said control signal generator;

(c) means at said main exchange also responsive to the commencement of an automatic repetition operation for breaking the connection of the receive loop between said substation and said main exchange and for connecting said control signal generator to the receive loop of said substation, whereby control signals are sent to said substation during the time of operation of said automatic repetition service; and (d) means at said substation responsive to said control signals for stopping the operation of the transmitter distributor for a predetermined period of time.

2. In a telegraph system, the combination, as defined in claim 1, in which the means at the main exchange responsive to the commencement of an automatic repetition operation for breaking the connection of the receive loop between the substation and the main exchange and for connecting the control signal generator to the receive loop of said substation comprises:

(a) switch means having two conditions of operation, the substation receive loop being connected to the distant exchange when in one condition and to the control signal generator when in the other condition;

(b) means normally maintaining said switch means in said one condition; and (c) means responsive to the operation of said automatic repetition service for shifting and switch means to its other condition.

3. In a telegraph system, the combination, as defined in claim 2, in which the control signal generator is a "blank" signal generator and produces signals representing a "blank."

4. In a telegraph system having a substation equipped with a transmitter distributor and a printer and adapted to communicate with a distant exchange via a main exchange to which said substation is connected over a send loop and a receive loop, said main exchange being equipped with automatic repetition service, the combination comprising:

(a) a "blank" signal generator at said main exchange producing signals representing a "blank";

(b) means at said main exchange responsive to the commencement of an automatic repetition operation for initiating the operation of said "blank" signal generator;

(c) switch means at the main exchange having two conditions of operation, the substation receiver loop being connected to the distant exchange when in one condition and to said "blank" signal generator when in the other condition:

(d) means normally maintaining said switch means in said one condition of operation;

(e) means responsive to the operation of said automatic repetition service for shifting said switch means to its other condition;

(f) a printer connected to the receive loop of said substation having "blank" sensing contacts adapted to be closed momentarily in response to the receipt of a "blank" signal;

(g) slow-to-release switch means adapted when operated to remain operated for a predetermined period of time;

(h) means for operating said slow-to-release switch means when said "blank"-sensing contacts are closed; and (i) means for stopping the operation of said transmitter distributor during the time of said slow-to-release means operation.

5. In a telegraph system, the combination, as defined in claim 4, in which the slow-to-release switch means are the break contacts of a relay having its energizing winding connected in series with the "blank"-sensing contacts across a source of voltage.

6. In a telegraph system, the combination, as defined in claim 4, in which the "blank" signal generator comprises:

(a) an astable multivibrator adapted when operated to remain in one condition of operation a predetermined time longer than in the other condition; and (b) switch means adapted to be operated by said astable multivibrator and connected in the output circuit of said generator;

and in which the means for initiating the operation of said "blank" signal generator comprises:

(a) means for normally biasing said astable multivibrator for maintaining it normally in one of its conditions; and (b) means for disabling said biasing means in response to the commencement of an automatic repetition operation.

7. In a telegraph system, the combination, as defined in claim 6, further comprising:

(a) means for adjusting the timing of the astable multivibrator for different speeds of operation.

8. In a telegraph system having a substation equipped with a transmitter distributor and a printer and adapted to communicate with a distant exchange via a main exchange to which said substation is connected over a send loop and a receive loop, said main exchange being equipped with automatic repetition service, the combination comprising:

(a) a control signal generator at said main exchange;

(b) means at said main exchange responsive to the commencement of an automatic repetition operation for initiating the operation of said control generator;

(c) means at said exchange also responsive to the commencement of an automatic repetition operation for breaking the connection of the receive loop between said substation and said main exchange and for connecting said control signal generator to the receive loop of said substation, whereby control signals are sent to said substation during the time of operation of said automatic repetition service;

(d) a printer connected to the receive loop of said substation having control-signal-sensing contacts adapted to be closed momentarily in response to the receipt of a control signal;

(e) slow-to-release switch means adapted when operated to remain operated for a predetermined period of time;

(f) means for operating said slow-to-release switch means when said control-signal-sensing contacts are closed; and (g) means for stopping the operation of said transmitter distributor during the time of said slow-to-release switch means operation.

9. In a telegraph system having a substation equipped with a transmitter distributor and a printer and adapted to communicate with a distant exchange via a main exchange to which said substation is connected over a send loop and a receive loop, said main exchange being equipped with automatic repetition service, the combination comprising:

(a) an astable multivibrator adapted when operated to remain in one condition of operation a predetermined time longer than in the other condition;

(b) switch means adapted to be operated by said astable mutlivibrator and connected in the output circuit thereof;

(c) means for normally biasing said astable multivibrator for maintaining it normally in one of its conditions;

(d) means for disabling said biasing means in response to the commencement of an automatic repetition operation so as to start the operation of said multivibrator;

(e) means at said main exchange also responsive to the commencement of an automatic repetition operation for breaking the connection of the receive loop between said substation and said main exchange and for connecting the output of said multivibrator to the receive loop of said substation, whereby control signals are sent to said substation during the time of operation of said automatic repetition service; and (f) means at said substation responsive to said control signals for stopping the operation of the transmitter distributor for a predetermined period of time.

10. In a telegraph system, the combination, as defined in claim 9, further comprising:

(a) means for adjusting the timing of the astable multivibrator for different speeds of operation.

11. In a telegraph system, the combination, as defined in claim 9, in which the astable multivibrator for producing the control signals is connected as a link in the receive loop between the main exchange and the substation.

References Cited by the Examiner

UNITED STATES PATENTS 2,706,215 4/1955 Van Duuren ---------- 178—2

NEIL C. READ, *Primary Examiner.*

ROBERT H. ROSE, *Examiner.*

A. J. DUNN, T. A. ROBINSON, *Assistant Examiners.*